United States Patent
Gold

[11] Patent Number: 5,688,016
[45] Date of Patent: Nov. 18, 1997

[54] AUTO GRIPPER MOLDING WITH CROWN MECHANICAL INTERLOCK

[76] Inventor: Peter Gold, 465 N. Wood Rd., Rockville Centre, N.Y. 11570

[21] Appl. No.: 629,003
[22] Filed: Apr. 8, 1996
[51] Int. Cl.[6] ................................................ B60J 1/02
[52] U.S. Cl. ...................................... 296/93; 52/208
[58] Field of Search .......................... 296/93, 96.21, 296/146.15, 201; 52/204.591, 204.597, 208

[56] References Cited

U.S. PATENT DOCUMENTS 4,986,594  1/1991  Gold et al. ............... 296/93 X
5,389,423  2/1995  Yada ........................ 296/93 X Primary Examiner—Andrew C Pike
Attorney, Agent, or Firm—Myron Amer PC

[57] ABSTRACT

In effectuating a urethane bond for an auto gripper molding of a type constructed of rubber a crown heretofore used to cover the gap surrounding the windshield peripheral edge is not used for a gap-covering function and instead the windshield-attached gripper molding is installed upside down and the crown is thus seated inside of the gap and in this position the cured urethane mechanically interlocks with notches providing in the surface of the crown in facing relation to the urethane. The interlocking prevents both unseating movement in the installed windshield and also gap-exposing movement in the crown as might allow undesirable water seepage into the gap.

2 Claims, 1 Drawing Sheet

AUTO GRIPPER MOLDING WITH CROWN MECHANICAL INTERLOCK

The present invention relates generally to installing a windshield and rubber gripper molding assembly and, more particularly, to improvements using urethane during the installation without any adverse consequence of the known inability of the urethane to bond to the gripper molding because its rubber construction material is chemically inert to the bonding function.

There are numerous prior patents which illustrate and describe gripper-type auto moldings, two such patents being exemplified by U.S. Pat. No. 4,765,673 and U.S. Pat. No. 5,009,462, both entitled "Windshield Reveal Molding", the former having issued to Peter W. Frabotta et al. on Aug. 23, 1988 and the latter having issued to Ricky V. Katcherian on Apr. 23, 1991. These and other gripper moldings protect the windshield peripheral edge against chipping during handling, as one example of their utility, by their strategic location about the windshield resulting from the peripheral edge thereof having an operative inserted position within a C-shaped compartment of the gripper molding.

Current practice is to supplement with an adhesive the installation position of the windshield-gripper molding assembly in the auto windshield opening, and the adhesive of choice is urethane because initially it is a viscous mass and subsequently cures into a hardened condition having a strong bond of approximately 1500 psi. In a replacement windshield installation the bond achieved using urethane is, however, only to glass and metal, it being well known that urethane will not bond to rubber, because rubber is chemically inert to the bonding function of urethane.

Broadly, it is an object of the present invention to overcome the foregoing and other shortcomings of the prior art in the use of urethane in replacement windshield installations using gripper moldings.

More particularly, it is an object to urethane bond a windshield and gripper molding assembly in its seated condition in the auto windshield opening without any adverse consequence due to the nonbonding of the urethane to the rubber surfaces of the gripper molding, thereby obviating the prior art vulnerability to leakage and windshield edge crazing that the referred-to nonbonding heretofore caused, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
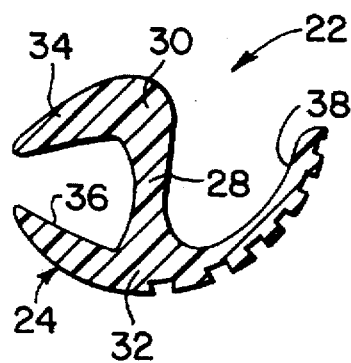
FIG. 1 is an isolated end cross-sectional view of the within inventive auto gripper molding illustrating its profile in cross section.

To obviate chipping and like damage in the peripheral edge 10 of an auto windshield 12 during storage and prior to the installation thereof upon a flange 14 having a horizontally oriented leg 16 and a vertically oriented leg 18 which bounds an auto windshield opening that is slightly oversized, as at 20, with respect to the slightly undersized windshield the current practice is to assemble an elastomeric molding 22 (see FIG. 1) along the windshield peripheral edge 10.

Figure 2:
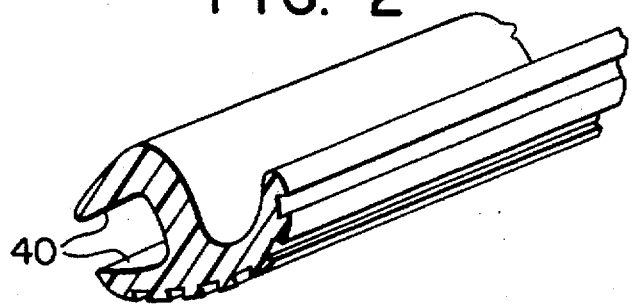
FIG. 2 is a perspective view of the gripper molding illustrating surface structural details of the crown portion thereof.
Figure 3:
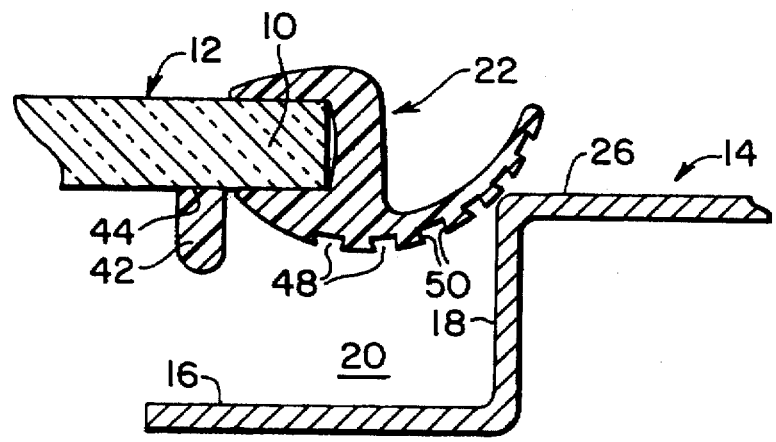
FIG. 3 is a cross-sectional view illustrating the seating of an assembled windshield and molding in an auto windshield opening.

The current practice contemplates using the molding 22 in an upside-down orientation than that depicted in FIG. 1 so that the so-called crown 24 serves as a closure extending over the gap 20 and establishing contact with the auto body 26. As a significant departure from this practice, the present invention uses the FIG. 1 molding 22 as shown in FIGS. 1 and 2 and with structural features as will be subsequently described, which results in establishing a mechanical interlocking with the cured urethane to assure that the windshield is firmly retained in its seated condition in the auto windshield opening 20, it being well known that in the curing of urethane from an initial viscous mass into a solid condition, that the latter will withstand a force up to 1500 psi but suffers from the drawback that the rubber construction material of the molding 22 is chemically inert to urethane and that consequently the two do not adhesively bond to each other at confronting surfaces, thus requiring the use of fins or the like in the structural embodiment of the molding to effectuate a mechanical interlocking between the molding and cured urethane. A non-fin, but significantly more effective, mechanical interlocking utility in the molding 22 will be better understood from the description which now follows.

Molding 22 is extruded with an upstanding leg which serves as its body 28 having at opposite top and bottom ends 30 and 32 respectively an inturned laterally extending gripper leg 34 integral at said top end 30, and the previously noted crown 24 in crossing relation formed integral at said body bottom end 32 and in a selected size to provide an inboard length portion 36 and, more significant, an enlarged sized outboard length portion 38 which is greater than the width of the gap 20. The crown inboard length portion 36 cooperates with the gripper leg 34 to bound therebetween an inwardly facing C-shaped notch 40 adapted to receive in projected relation therein the windshield peripheral edge 10, so as to protect the edge against chipping and like damage during storage of the windshield and prior to its aftermarket use as a replacement for a damaged windshield.

Pending this aftermarket use, in the installation assembly of windshield and molding 12, 22, a dam 42 is adhesively secured, as at 44, inwardly and in depending relation about the windshield peripheral edge 10, so that the positioning of the windshield 12 within the auto windshield opening 20 seats dam 42 upon the flange leg 16 and said dam 42 and peripheral edge 10 with its assembled molding 22 cooperate with the flange legs 16 and 18 to form the gap 20 resulting from the oversized and undersized auto windshield opening and windshield respective size relationship into a urethane-receiving compartment, designated by the gap reference numeral 20, and the serving of the enlarged size crown outboard length portion 38 as an arcuate-shaped closure, generally designated 46, for the compartment 20.

Figure 4:
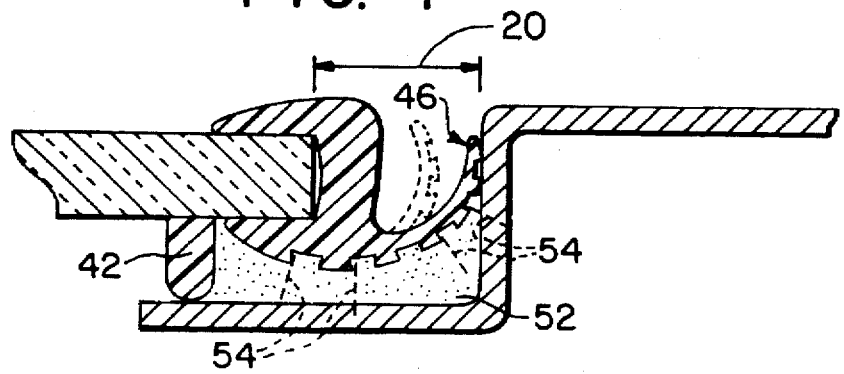
FIG. 4 is a view similar to FIG. 3 but illustrating urethane bonding in place of the assembled windshield and molding.

To use to maximum advantage the closure functioning of the crown outboard length portion 38, the surface of this length portion is extruded with plural notches 48 with converging angularly inclined opposite sides 50, and urethane 52 in a viscous mass state is appropriately deposited under a lifted closure 46, as depicted in phantom perspective in FIG. 4, into the compartment 20, and flows into the notches 48 and in accordance with a known phenomenon hardens after a curing time interval within the notches 48 to establish behind the notch inclined sides 50 a trapezoidal shape that provides mechanical interlocking connections in the cured urethane, as depicted by the reference lines 54, from the molding 22 both to the flange leg 16 which obviates unseating movement of the windshield 12, and also to the flange leg 18 which obviates gap-opening movement of the closure 46 as might permit water seeping into the gap 20 having a known freezing and thawing cycle potentially damaging to the installed windshield 12.

Although not shown but as should be readily understood from the proceeding description, there is sufficient flexibility and length in the closure 46 to impart a configuration that is not limited to an upwardly facing U-shape as shown in FIG. 4, but could also be the reverse thereof, i.e. a downwardly facing U-shape. In the latter configuration, the notches 50 are located on the reverse surface of the closure 46 and molding 22 is installed in the traditional manner to the windshield 10, thereby reversing the positions of crown overhang 24 and gripper leg 34, all to the end of achieving the previously noted mechanical interlocks 54 to the flange wall 18 which obviates gap-opening movement of the closure 46.

While the molding herein shown and disclosed in detail is fully capable of attaining the objects and providing the advantages hereinbefore stated, it is to be understood that it is merely illustrative of the presently preferred embodiment of the invention and that no limitations are intended to the construction of the molding other than as defined in the appended claims.

What is claimed is:

1. An auto windshield gripper molding with mechanical interlocking utility of a type installed in an auto windshield opening bounded by a flange having an inturned horizontally oriented leg and a vertically oriented leg and a windshield having a peripheral edge and a dam adhesively secured in depending relation inwardly of said peripheral edge, said gripper molding comprising a vertically oriented body having opposite top and bottom ends, a crown in crossing relation formed integral at said body bottom end of a selected size presenting inboard and outboard length portions on opposite sides of said body, a gripper leg in an inturned laterally extending relation integral at said body top end cooperating with said crown inboard length portion to bound therebetween an inwardly facing C-shaped notch adapted to receive in projected relation therein said peripheral edge of said windshield for forming an installation assembly of said windshield and said molding, said installation assembly having an operative position seated in said auto windshield opening such that said dam, said molding, said and said horizontally and vertically oriented flange legs cooperate to bound a urethane-receiving compartment for a deposit of urethane for bonding in place of said windshield, said size of said crown being selected to impart to said crown outboard length portion with an operative position extending in crossing relation over said urethane-receiving compartment so as to serve as an arcuate-shaped closure for said compartment, and plural shaped notches in said arcuate-shaped closure therein for receiving the urethane in a viscous state incident to the deposit thereof in said urethane-receiving compartment, whereby upon a curing of said viscous urethane into a solid condition there results a mechanical interlocking of said molding crown notches located both above said flange horizontally oriented leg and also in facing relation to said flange vertically oriented leg.

2. The auto windshield gripper molding as claimed in claim 1 wherein a configuration of said arcuate-shaped closure is of an upwardly facing U-shape and said plural shaped notches are in an underlying surface thereof.

* * * * *